United States Patent
Noatschk et al.

(10) Patent No.: US 10,669,447 B2
(45) Date of Patent: *Jun. 2, 2020

(54) METHOD FOR PRODUCING A COATING

(71) Applicant: BASF Coatings GmbH, Münster (DE)

(72) Inventors: Jens-Henning Noatschk, Muenster (DE); Eva-Kathrin Schillinger, Muenster (DE); Simon Winzen, Muenster (DE)

(73) Assignee: BASF Coatings GmbH, Münster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/343,465

(22) PCT Filed: Oct. 9, 2017

(86) PCT No.: PCT/EP2017/075668
§ 371 (c)(1),
(2) Date: Apr. 19, 2019

(87) PCT Pub. No.: WO2018/073034
PCT Pub. Date: Apr. 26, 2018

(65) Prior Publication Data
US 2019/0270911 A1    Sep. 5, 2019

(30) Foreign Application Priority Data
Oct. 20, 2016  (EP) .................... 16194843

(51) Int. Cl.
| | | |
|---|---|---|
| *B05D 7/02* | (2006.01) | |
| *B05D 7/04* | (2006.01) | |
| *B05D 7/26* | (2006.01) | |
| *B05D 1/02* | (2006.01) | |
| *B05D 5/08* | (2006.01) | |
| *B05D 5/00* | (2006.01) | |
| *C09D 175/08* | (2006.01) | |
| *C08G 18/80* | (2006.01) | |
| *C08J 9/36* | (2006.01) | |
| *C09D 5/00* | (2006.01) | |
| *C09D 175/04* | (2006.01) | |
| *C08G 18/79* | (2006.01) | |

(52) U.S. Cl.
CPC ............ *C09D 175/08* (2013.01); *B05D 1/02* (2013.01); *B05D 5/00* (2013.01); *B05D 5/08* (2013.01); *B05D 7/02* (2013.01); *B05D 7/04* (2013.01); *B05D 7/26* (2013.01); *C08G 18/792* (2013.01); *C08G 18/80* (2013.01); *C08G 18/8064* (2013.01); *C08J 9/365* (2013.01); *C09D 5/00* (2013.01); *C09D 175/04* (2013.01); *B05D 2201/00* (2013.01); *B05D 2201/02* (2013.01); *B05D 2401/20* (2013.01); *B05D 2503/00* (2013.01); *C08J 2375/04* (2013.01); *C08J 2475/08* (2013.01)

(58) Field of Classification Search
CPC ...... C09D 175/08; C09D 175/04; C09D 5/00; C08L 175/04; B05D 1/02; B05D 5/00; B05D 5/08; B05D 7/02; B05D 7/04; B05D 7/26; B05D 2201/00; B05D 2201/02; B05D 2401/20; B05D 2503/00; C08G 18/8064; C08G 18/792; C08G 18/80; C08J 9/365; C08J 2375/04; C08J 2475/08
See application file for complete search history.

(56) References Cited

U.S. PATENT DOCUMENTS

| | | | |
|---|---|---|---|
| 10,329,450 B2 * | 6/2019 | Noatschk | C08G 18/706 |
| 2006/0141234 A1 | 6/2006 | Rearick et al. | |
| 2014/0050928 A1 * | 2/2014 | Gebauer | B05D 7/53 428/446 |
| 2018/0187043 A1 | 7/2018 | Noatschk et al. | |
| 2018/0187044 A1 * | 7/2018 | Noatschk | C08G 18/706 |

FOREIGN PATENT DOCUMENTS

| | | | |
|---|---|---|---|
| DE | 19930665 A1 | 1/2001 | |
| WO | 2003035710 A1 | 5/2003 | |
| WO | 2007082838 A1 | 7/2007 | |
| WO | 2008113775 A2 | 9/2008 | |
| WO | 2008125250 A1 | 10/2008 | |
| WO | 2009101133 A1 | 8/2009 | |
| WO | 2013153190 A1 | 10/2013 | |
| WO | 2015164855 A1 | 10/2015 | |
| WO | WO-2016188656 A1 * | 12/2016 | C08G 18/706 |

OTHER PUBLICATIONS

European Search Report for EP Patent Application No. 16194843.5, dated Apr. 10, 2017, 3 pages.
English translation of International Search Report for International Application No. PCT/EP2017/075668, dated Nov. 10, 2017, 2 pages.

* cited by examiner

*Primary Examiner* — William P Fletcher, III
(74) *Attorney, Agent, or Firm* — Armstrong Teasdale LLP

(57) ABSTRACT

A method for producing a coating on a substrate. The method includes producing a clearcoat directly on the substrate by applying an aqueous clearcoat material directly to the substrate. The method further includes curing the applied clearcoat material, the clearcoat material being a two-component coating composition. Also disclosed are coatings produced according to the method and their uses.

17 Claims, No Drawings

METHOD FOR PRODUCING A COATING

CROSS-REFERENCE TO RELATED APPLICATIONS

This application is a U.S. National Phase Application of PCT/EP2017/075668, filed Oct. 9, 2017, which claims the benefit of priority to EP Application No. 16194843.5, filed Oct. 20, 2016, the contents of which are hereby expressly incorporated by reference in their entirety.

The present invention relates to a method for producing a coating on a substrate by directly producing a clearcoat on the substrate. The present invention further relates to a coating produced by the method of the invention. The coatings produced in this way have not only a high-level optical appearance and good tactile qualities but also outstanding mechanical resistance and flexibility and also excellent dirt repellence or soil attraction resistance. Moreover, the weathering stability is outstanding as well. Furthermore, retention achieved of protective substances applied to the coating, such as impregnating sprays, is extremely good (also called retention behavior hereinafter). This means that in spite of external influences such as mechanical loading, a protective substance of this kind remains much longer on the surface and accordingly is able to exert its protective function more effectively. The method can therefore be used to particularly good effect in those sectors imposing equal demands on optical quality and mechanical stability and flexibility of coated substrates. Thus, for example, though not exclusively, the method is appropriate for application in the footwear industry, in the coating in particular of soles composed of foam substrates.

PRIOR ART

Mechanical stability and flexibility are properties which are absolutely essential for coatings or varnish coats on substrates in a very wide variety of industrial sectors. Mechanical stability—abrasion resistance and stonechip resistance, for example is of course critically relevant in any application sector where such external influences are experienced. An acceptable flexibility, though, is very important for the coating of almost any substrate. Flexibility is particularly relevant to the coating of flexible substrates such as foams, textiles, and leather, since the areas of application of such flexible and deformable substrate materials are accompanied by corresponding deformation stresses which affect the coatings as well. On rigid substrates likewise, however, such as hard plastics, metal, or wood, the capacity of the coating to remain intact under deformation stress is very important. For instance, very thin substrates composed of inherently rigid materials may likewise be subject to significant deformations in use. Moreover, changes to materials as a result of temperature differences (expansion coefficient) likewise necessitate a commensurate flexibility on the part of the coatings.

The properties identified are particularly relevant to the coating of flexible substrates such as flexible foam substrates. Foams are an established substrate material in many industrial sectors, for a wide variety of applications. The established position is due to good processing properties, low density, and variable possibilities for the setting of profiles of properties (rigid, semirigid, and flexible foams, thermoplastic or elastomeric foams).

In the footwear industry, for example, compressible, elastically deformable foams are often used in the production of footwear soles such as midsoles, for example. The exposure of soles to massive mechanical stresses is obvious. Walking and running necessitate on the one hand a high flexibility or elasticity of the soles, but on the other hand a commensurate resistance to external mechanical influences as well, such as good abrasion resistance and stonechip resistance, for example.

Besides the properties already stated, good soil attraction resistance, good retention behavior, and high weathering stability (stability toward influences such as UV light, temperature, atmospheric humidity) are desirable in virtually all conceivable fields of application. This is especially true, of course, for the sector of the footwear and textile industries.

At the same time, the footwear industry sector, like any sector of the fashion industry, requires the possibility for visual enhancement of the products in question.

The coating or varnishing of foam substrates such as footwear soles enables precisely this fashion adaptation.

In this case, however, it is vital for the coating to be optically adapted in an optimum manner. In the fashion industry, in general, a commensurate matting effect or low gloss is an important factor. This is because this is the only way to produce products having a visually high-value and refined profile. Products which are too shiny are generally considered to be "plasticky" and cheap-looking. Equally, however, especially in sectors outside the fashion industry, or else for the provision of—for example—niche products within the fashion sector, it may be necessary to achieve particularly high degrees of gloss. It must therefore be possible for the optical and/or esthetic profiles to be adapted individually.

A major challenge is to produce the overall system, comprising foam substrate and coating or coating system, in such a way that the aforementioned properties are achieved in combination. The overall systems are required to convince not only on a purely optical basis. Instead, as well as the foam substrate, the coating itself, as well, or the overall system comprising substrate and coating, must have the flexibility already addressed above. Additionally it is necessary to achieve high mechanical resistance on the part of the coating, soil attraction resistance, and weathering stability.

US 2006/0141234 A1 describes manufactured articles, footwear soles for example, which comprise a compressible substrate which has been coated with an aqueous coating composition. The composition comprises a polyurethane resin having a hydroxyl number of less than 10, and a colorant. The composition is used for enhancing the visual value of the articles.

WO 2009/101133 A1 discloses composite structures comprising a polyurethane base, such as an integral polyurethane foam, and also a surface coating applied thereon. The surface coating consists of thermoplastic polyurethane, which is applied in the form of a foil. The composite is stable to UV radiation and mechanical load and can be used as an interior automotive component or as a footwear sole.

WO 2008/113775 A1 describes aqueous dispersions comprising at least one polyurethane, at least one specific polyisocyanate, and a silicone compound. The dispersion is used to coat sheetlike substrates such as leather, textile, or plastics, and results in high tactility, grip, and rub fastness.

In spite of these highly promising approaches, there is still great potential for improvements, especially with regard to a combination of optical quality and soil attraction resistance on one hand and mechanical stability and also flexibility on the other.

OBJECT

It was an object of the present invention, then, to provide a method for producing a coating via which coatings on substrates are obtained that initially have good optical quality, more particularly a high matting effect as and when required and, consequently, an optically high-grade and refined appearance. At the same time, however, the coatings ought to have high mechanical resistance and flexibility and also soil attraction resistance, good retention behavior, and weathering stability. This means in particular that they ought first to have a high flexibility or elasticity, allowing the corresponding advantages of flexible substrates in particular to be fully manifested. Secondly, however, the stability with respect to external mechanical influences ought also to be outstanding. Particular reference may be made to the abrasion resistance and stonechip resistance. In addition, the coating compositions used for producing the coatings ought to be aqueous, in order to thereby permit the best possible environmental profile.

TECHNICAL ACHIEVEMENT

It has been found that the stated objects could be achieved by a new method for producing a coating (B) on a substrate (S), comprising:

(I) producing a clearcoat (K) directly on the substrate (S) by applying an aqueous clearcoat material (k) directly to the substrate (S) and subsequently curing the applied clearcoat material (k), the clearcoat material (k) being a two-component coating composition comprising (k.1) a paint base component comprising (1) at least one aqueous dispersion comprising water and a polyurethane resin fraction consisting of at least one polyurethane resin, the polyurethane resin fraction having a gel fraction of at least 50 wt %, having its glass transition at a temperature of less than $-20°$ C., and having its melting transition at a temperature of less than $100°$ C., and (k.2) a curing component comprising (2) at least one hydrophilically modified polyisocyanate having an isocyanate content of 8% to 18%.

The above-stated method is also referred to below as method of the invention and is, accordingly, a subject of the present invention. Preferred embodiments of the method of the invention are apparent from the description which follows hereinafter and also from the dependent claims.

Further subjects of the present invention are a coating produced with the method of the invention, and also a substrate coated with such a coating.

The method of the invention permits the production of coatings on substrates that exhibit not only outstanding optical qualities but also massive flexibility or elasticity and at the same time an effective stability with respect to external mechanical influences as well. Furthermore, there is high soil attraction resistance, good retention behavior, and good weathering stability. The overall systems comprising the coating and the substrate can therefore, especially in the case of foam substrates, be used to particularly good effect, though not only, in the footwear industry sector, as soles.

COMPREHENSIVE DESCRIPTION

Elucidation will first be given of a number of terms used in the context of the present invention.

The application of a coating composition to a substrate is understood as follows. The respective coating composition is applied in such a way that the coat produced therefrom is borne by the substrate, but need not necessarily be in direct contact with the substrate. Between the coat and the substrate, for example, there may also be other coats.

In contrast to this, the application of a coating composition directly to a substrate is understood as follows. The respective coating composition is applied in such a way that the coat produced therefrom is disposed on the substrate and is in direct contact with the substrate. In particular, therefore, there is no other coat disposed between coat and substrate. This principle is valid, for example, in connection with the clearcoat material (k) to be applied directly to the substrate in accordance with the invention.

Flashing, interim drying, and curing are understood in the context of the present invention to comprehend the terminological content familiar to the skilled person in connection with methods for producing coatings. Flashing, accordingly, is understood fundamentally as a designation for the evaporation or evaporating of organic solvents and/or water from a coating composition applied as part of the production of a varnish coat, usually at ambient temperature (that is, room temperature), 15 to $35°$ C. for example, for a time of 0.5 to 30 minutes, for example. During flashing, therefore, there is evaporation of organic solvents and/or water present in the applied coating composition. Since the coating composition is still flowable, at any rate directly after application and at the start of flashing, it may flow in the course of flashing. This is because a coating composition applied by spray application, at least, will generally be applied in droplet form and not in uniform thickness. As a result of the organic solvents and/or water present, however, it is fluid and may therefore flow to form a uniform, smooth coating film. At the same time, there is successive evaporation of organic solvents and/or water, resulting after the flashing phase in a comparatively smooth coat, containing less water and/or solvent by comparison with the applied coating composition. After flashing, however, the coat is not yet in the ready-to-use state. While it is no longer flowable, for example, it is still soft and/or tacky, and may be only partly dried. In particular, the coat is not yet cured as described later on below.

Interim drying is therefore understood likewise as the evaporation or evaporating of organic solvents and/or water from a coating composition applied as part of the production of a varnish coat, usually at a temperature elevated relative to ambient temperature, of 40 to $70°$ C., for example, for a time of 1 to 30 minutes, for example.

In the case of interim drying as well, therefore, the applied coating composition will lose a fraction of organic solvents and/or water. Relative to a particular coating composition, it is generally the case that interim drying, in comparison to the flashing, takes place at, for example, higher temperatures and/or for a longer time, meaning that, in comparison to the flashing, a higher fraction of organic solvents and/or water also escapes from the applied coat. Ultimate delimitation of the two terms from one another, however, is neither necessary nor desirable. For ease of comprehension, these terms are used in order to make it clear that a variable and sequential conditioning of a coat may take place, prior to the curing described below. Depending on the coating composition, the evaporation temperature, and the evaporation time, more or less high fractions of the organic solvents and/or water present in the coating composition may evaporate. Possibly there may even already be interlooping or crosslinking among a fraction of the binder polymers present in the coating composition, as described below. Neither during flashing nor during interim drying, however, is a ready-to-use coat obtained, as is the case for the curing described below. Curing, accordingly, is clearly delimited from the flashing and interim drying.

The curing of an applied coating composition is understood accordingly to be the conversion of such a coat into the ready-to-use state, in other words into a state in which the coated substrate can be transported, stored, and used in its intended manner. A coat thus cured, then, is in particular no longer soft or tacky, but instead is conditioned as a solid coating film which, even on further exposure to curing conditions as described later on below, no longer exhibits any substantial change in its properties such as hardness or adhesion to the substrate.

As is known, coating compositions may in principle be cured physically and/or chemically, depending on components present such as binders and crosslinking agents. In the case of chemical curing, particular consideration is given to thermochemical curing.

In the context of the present invention, "physically curable" or the term "physical curing" means the formation of a cured coat by loss of solvent from polymer solutions or polymer dispersions, with the curing being achieved by interlooping of polymer chains. Coating compositions of these kinds are formulated generally as one-component coating materials. A cure may take place, for example, between 15 and 100° C. over a time of 2 to 48 hours. In this case, curing differs from flashing and/or interim drying, therefore, possibly only in the duration of the conditioning of the coat.

In the context of the present invention, "thermochemically curable" or the term "thermochemical curing" means the crosslinking of a coat (formation of a cured coat) that is initiated by chemical reaction of reactive functional groups, the energetic activation of this chemical reaction being possible through thermal energy. Different functional groups which are complementary to one another can react with one another (complementary functional groups), and/or the formation of the cured coat is based on the reaction of autoreactive groups, in other words functional groups which react among one another with groups of their own kind. Examples of suitable complementary reactive functional groups and autoreactive functional groups are known from German patent application DE 199 30 665 A1, page 7, line 28, to page 9, line 24, for example. The groups are then present in the various film-forming components of the coating composition.

Thermochemical curing may be enabled through use of any of a very wide variety of different film-forming components. Typical, for example, is the use of an organic polymer such as a polyester or polyurethane containing particular functional groups such as hydroxyl groups, and of a further component, as for example a polyisocyanate and/or an amino resin, which are able then to lead to a cured coating film by reaction of the correspondingly complementary functional groups. For greater ease of comprehension, the (first) organic polymer, the polyester for example, is often referred to as the binder, and the polyisocyanate and/or amino resin as the crosslinking agent.

Depending on the reactivity of the functional groups present in the film-forming components, coating compositions of these kinds are formulated as one-component and multicomponent systems, more particularly two-component systems.

In thermochemically curable one-component systems, the components to be crosslinked—for example, organic polymers as binders, and crosslinking agents—are present alongside one another, in other words in one component. A requirement for this is that the components to be crosslinked should only react with one another—that is, enter into curing reactions—at higher temperatures of more than 100° C., for example. Curing, therefore, will take place under corresponding conditions, such as at temperatures of 100 to 250° C. for a time of 5 to 60 minutes, for example.

In thermochemically curable two-component systems, the components to be crosslinked—for example, the organic polymers as binders, and the crosslinking agents—are present separately from one another in at least two components, which are not combined until shortly before application. This form is selected when the components to be crosslinked react with one another even at ambient temperatures or slightly elevated temperatures of between 40 and 100° C., for example. Reference may be made by way of example to hydroxyl groups or amino groups on the one hand and to free isocyanate groups on the other. In general, and particularly in the context of the present invention, a two-component coating composition is formulated in such a way that a first component (paint base component) and a second component (curing component) are produced and stored separately from one another and are not combined until shortly before application to a substrate. The exact working time (that is, the time within which the coating composition can be processed at room temperature (15 to 25° C., especially 20° C.) without, for example, such a great increase in viscosity, as a result of corresponding crosslinking reactions at room temperature, that application is no longer possible) is of course dependent on the constituents used, but in general is between 1 minute and 4 hours, preferably between 5 and 120 minutes.

Likewise assignable to thermochemical curing is the following principle. A first component of the coating composition may react, with addition of a further component, in such a way that there is proportional formation of functional groups which are able to enter into curing reactions as described above with other functional groups of the first component. In this way, then, there is again a contribution to film formation. For example, a free polyisocyanate, in other words a first component containing on average more than one free isocyanate group per molecule, will react correspondingly following addition of water as a second component. The reason is that free isocyanate groups react with water, with elimination of carbon dioxide, to form free primary amino groups, which are then converted into urea bonds by addition reaction with isocyanate groups that are still present.

A coating composition in whose curing this form of thermochemical curing is to be employed will therefore likewise be formulated as a two-component coating composition. The reason is that both the hydrolysis of the isocyanate groups to amino groups and the reaction of amino groups with isocyanate groups take place even at ambient temperatures or slightly elevated temperatures of between 40 and 100° C., for example. Therefore, while the water is present in one component, the free polyisocyanate is integrated into the second component. Then, after the two components have been combined, primary amino groups are formed, and are able to react with isocyanate groups still present and so to form a network.

Of course, in the curing of a coating composition identified as being thermochemically curable, there will always also be physical curing, in other words interlooping of polymer chains. Nevertheless, a coating composition of this kind will be referred to in this case as thermochemically curable. This designation, then, is selected whenever the coating composition can proportionally be thermochemically cured.

In the context of the present invention, the curing of two-component coating compositions takes place preferably at temperatures between 40 and 120° C. The duration of curing is of course dependent on the circumstances of the case in hand, but is generally from 5 to 120 minutes, for example.

All of the temperatures elucidated in the context of the present invention should be understood as the temperature of the space within which the coated substrate is located. They do not therefore mean that the substrate itself must have the temperature in question.

Depending on the substrate used, it is necessary of course to ensure, in the context of the method of the invention, that the substrate, for the curing of coating films applied thereon, is not heated to such a level that it undergoes decomposition or deformation. Foam substrates, which are used with preference in the context of the present invention, are not dimensionally stable, however, in general at temperatures of 120° C. or more. Possibly even much lower temperatures are already sufficient to bring about decomposition or deformation of the substrate. At any rate, the curing of coats in the context of the present invention is carried out preferably at below 120° C., more preferably below 100° C.

It is also understandable in this context that the clearcoat material (k) is a two-component coating composition. This is because such compositions, as described above, can be cured at temperatures between 40 and 100° C. This ensures that the substrate need only be heated to temperatures of less than 100° C. Depending on the substrate used, however, it may also be heated to higher temperatures for even quicker curing. It is nevertheless preferred for any curing operations in the context of the method of the invention to be carried out at below 120° C., even more preferably at below 100° C.

With preference the foam substrate in the context of the method of the invention is never exposed to temperatures of 120° C. or more, preferably never to temperatures of 100° C. or more.

Where reference is made in the context of the present invention to an official standard, without indication of the official validity period, the reference is of course to the version of the standard valid on the filing date or, if there is no valid version at that date, then to the most recent valid version.

The Method of the Invention

In the context of the method of the invention, a coating (B) is produced on a substrate (S).

As substrates (S) it is possible ultimately to use all rigid or flexible substrates known to the skilled person, examples being those composed of metals, hard plastics, wood, paper and card, textiles, leather goods, and foams. Preference in the context of the present invention is given to flexible substrates, more particularly flexible foam substrates, since the properties identified at the outset are particularly important in the coating of such substrates.

As a brief basic introduction, foam substrates (S) contemplated are ultimately all substrates known in this context to the skilled person. In principle, therefore, it is possible to use foams produced from thermosets, thermoplastics, elastomers, or thermoelastics, in other words obtained by corresponding foaming processes from plastics from the stated classes of polymer. In terms of their chemical basis, possible foams include for example, but not exclusively, polystyrenes, polyvinyl chlorides, polyurethanes, polyesters, polyethers, polyetheramides, or polyolefins such as polypropylene, polyethylene, and ethylene-vinyl acetate, and also copolymers of the polymers stated. A foam substrate may of course also include a variety of the polymers and copolymers identified.

Preferred foam substrates are flexible foam substrates, especially preferably flexible thermoplastic polyurethane foam substrates. The latter, then, are foam substrates comprising thermoplastic polyurethane as their polymeric plastics matrix. A fundamental quality of such substrates is that they are compressible and elastically deformable.

In the production of the foams, the thermoplastic polyurethane is foamed—that is, converted into a foam—by corresponding foaming processes.

Foaming processes are known, and will therefore be presented only briefly. A fundamental principle in each case is that blowing agents and/or gases in solution in the plastic or in a corresponding plastics melt, and formed in cross-linking reactions in the production of corresponding polymeric plastics, are released and so bring about the foaming of the hitherto comparatively dense polymeric plastics. For example, where a low-boiling hydrocarbon is employed as a blowing agent, it vaporizes at elevated temperatures and leads to foaming.

Gases such as carbon dioxide or nitrogen as well can also be introduced into the polymer melt at high pressure and/or dissolved therein, as blowing agents. As a result of a later drop in pressure, the melts then foam during the escape of the blowing agent gas.

The foaming may take place, for example, directly during shaping of corresponding plastics substrates, as for example in the course of extrusion or injection molding. The plastics melt, under pressure and with blowing agent added, may be foamed, for example, on emergence from an extruder, by virtue of the pressure drop that then occurs.

It is also possible first to produce pellets of thermoplastic, these pellets containing blowing agent, and then to foam these pellets subsequently in a mold, with the pellets increasing their volume, fusing with one another, and ultimately forming a molding consisting of fused expanded foam beads (also called thermoplastic bead foam). The expandable pellets may be formed, for example, by extrusion and subsequent pelletizing of the polymer strand exiting the extruder. Pelletization is accomplished, for example, via appropriate chopping devices, operating under pressure and temperature conditions such that no expansion occurs. The expansion that then follows and the fusing of the pellets take place in general with the aid of steam at temperatures of around 100° C.

It is also possible to start from plastics pellets that have already been prefoamed when producing thermoplastic bead foams. These are pellets whose individual pellets or polymer beads, in comparison to pellets that have not been prefoamed, already exhibit substantially increased bead sizes with correspondingly reduced densities. The production of beads with controlled prefoaming can be realized by appropriate process control, as described in WO 2013/153190 A1, for example. Hence, on exiting the extruder, extruded polymer strands may be passed into a pelletizing chamber with a stream of liquid, the liquid being under specific pressure and having a specific temperature. Through adaptation of the operating parameters, it is possible to obtain specific expanded or preexpanded thermoplastic pellets, which can be converted into thermoplastic bead foam substrates by subsequent fusing and, optionally, further expansion with—in particular—steam.

Thermoplastic bead foams and corresponding thermoplastic, expandable and/or expanded pellets from which such bead foams may be produced are described in WO 2007/082838 A1, WO 2013/153190 A1 or else WO 2008/125250 A1, for example. Also described therein are operational parameters and starting materials for the production of thermoplastic polyurethanes, and also operational parameters for the production of pellets and bead foams.

Thermoplastic bead foams, especially thermoplastic polyurethane bead foams, can be produced in a very economic way, on an industrial scale in particular and are also particularly advantageous in terms of their profile of properties. Accordingly, thermoplastic bead foams may be produced from thermoplastics, more particularly from polyurethanes, the foams exhibiting outstanding flexibility or elasticity and mechanical stability. In general they are compressible and readily elastically deformable. Accordingly, these foams especially are particularly suitable as foam substrates for applications in sectors such as the footwear industry. Especially preferred substrates, then, are compressible, elastically deformable bead foam substrates which comprise thermoplastic polyurethane as their polymeric plastics matrix.

The substrates, preferably the flexible foam substrates, may intrinsically have any desired shape—that is they may, for example, be simple sheetlike substrates or else more complex shapes such as, in particular, footwear soles such as midsoles.

In the method of the invention a clearcoat (K) is produced. It is produced by applying an aqueous clearcoat material (k) directly to the substrate (S) and subsequently curing the applied clearcoat material (k).

In spite of no coating materials such as adhesion primers or basecoat materials, for example, being used, which in principle can be applied ahead of the clearcoat material and can be disposed between clearcoat and substrate in the final coating, outstanding adhesion is achieved as part of the method of the invention. Refraining from applying such coating materials before applying the clearcoat material (k) results in a massive simplification in the method.

A clearcoat material (k) is a transparent coating material known in this sense to the skilled person. "Transparent" means that a coat formed with the coating composition is not opaquely coloured, but instead has a constitution such that the color of the underlying substrate remains visible. This, however, as is known, does not rule out the possibility of pigments also being present, in minor amounts, in a clearcoat material.

In any case, however, the term "clearcoat" is clearly delimited from the term "basecoat", referring to an intermediate coating material which imparts color and/or effect and can be used in general industrial coating.

The clearcoat materials (k) are described in detail later on below. In any case, however, through the presence of water in the paint base component, and component (2) in the curing component, the compositions in question are in any case thermochemically curable two-component coating compositions.

The clearcoat materials (k) may be applied by the methods known to the skilled person for applying liquid coating compositions, as for example by dipping, knife coating, spraying, rolling, or the like. Preference is given to employing spray application methods, such as compressed air spraying (pneumatic application), airless spraying, high-speed rotation, electrostatic spray application (ESTA), optionally in conjunction with hot spray application such as hot air (hot spraying), for example. With very particular preference the clearcoat materials (k) are applied by pneumatic spray application or electrostatic spray application.

Such application may take place in the form of single application or else multiple application, an example being dual application.

The clearcoat material (k) is preferably subjected after application to flashing or interim drying at 15 to 35° C. for a time of 0.5 to 30 minutes.

This is then followed by the curing of the applied clearcoat material (k), ultimately producing a clearcoat (K), i.e., a cured clearcoat film.

Curing takes place preferably at temperatures between 40 and 120° C., more preferably between 60 and 100° C., for a time of, for example, 2 to 120 minutes, preferably 5 to 60 minutes. In this way, decomposition or deformation of preferred substrates, specifically foam substrates, in particular, is also avoided.

The result after the curing of the applied clearcoat material (k) is a coating (B) of the invention. With preference the coating (B) consists exclusively of the clearcoat (K).

The Clearcoat Materials for Inventive Use

The clearcoat material (k) for inventive use comprises at least one specific aqueous dispersion (1) in the paint base component (k.1).

The aqueous dispersion (1) at any rate comprises water and a polyurethane resin fraction, with this polyurethane resin fraction consisting of at least one polyurethane resin.

Polyurethane resins, their preparation, and a starting products which can be used are known. Hence the resins are preparable, for example, by conventional polyaddition of polyisocyanates with polyols and also polyamines.

Polyisocyanates contemplated include the known aliphatic, cycloaliphatic, aliphatic-cycloaliphatic, aromatic, aliphatic-aromatic and/or cycloaliphatic-aromatic polyisocyanates, examples being the polyisocyanates (2a) identified later on below.

Examples of suitable polyols are saturated or olefinically unsaturated polyester polyols and/or polyether polyols. Employed more particularly as polyols are polyester polyols. Such polyester polyols, preferably polyester diols, may be prepared in a known way by reaction of corresponding polycarboxylic acids and/or their anhydrides with corresponding polyols by esterification. Of course it is also possible, optionally and additionally, for proportional use to be made of monocarboxylic acids and/or monoalcohols for the preparation. The polyester diols are preferably saturated, more particularly saturated and linear.

Further possibilities for use are polyamines such as diamines and/or amino alcohols. Diamines are exemplified by hydrazine, alkyl- or cycloalkyldiamines such as propylenediamine and 1-amino-3-aminomethyl-3,5,5-tri-methyl-cyclohexane, and amino alcohols by ethanolamine or diethanolamine. Corresponding polyurethane resins in that case therefore also contain urea bonds. Resins of this kind, however, are referred to generally and also in the context of the present invention as polyurethane resins.

With regard to the dispersion (1) for inventive use, and to the polyurethane resin fraction and the polyurethane resins that constitute this fraction, however, there are specific conditions applying, which are elucidated below.

The polyurethane resin fraction possesses a gel fraction of at least 50 wt % (for measurement method, see Examples section).

The dispersions (1) for inventive use therefore constitute microgel dispersions. A microgel dispersion, as is known, is initially a polymer dispersion, in other words a dispersion in which there is at least one polymer as dispersed medium in the form of particles or polymer particles. The polymer particles are at least partly intramolecularly crosslinked. The latter means that the polymer structures present within a particle equate at least partly to a typical macroscopic network with a three-dimensional network structure. Viewed macroscopically, however, a microgel dispersion of this kind is still a dispersion of polymer particles in a dispersion medium, in the present case, more particularly, water. While the particles can in part form crosslinking bridges between one another (something which in fact can hardly be ruled out simply from the preparation process), the system is nevertheless in any case a dispersion with discrete particles present in it that have a measurable particle size.

Because the microgels represent structures which lie between branched and macroscopically crosslinked systems, they combine, consequently, the characteristics of macromolecules with network structure that are soluble in suitable organic solvents, and of insoluble macroscopic networks, and so the fraction of the crosslinked polymers can be determined, for example, only following isolation of the solid polymer, after removal of water and any organic solvents, and subsequent extraction. The phenomenon utilized here is that the microgel particles, originally soluble in suitable organic solvents, retain their inner network structure after isolation and behave, in the solid, like a macroscopic network. Crosslinking may be verified via the experimentally accessible gel fraction. The gel fraction is ultimately that fraction of the polymer from the dispersion that cannot be molecularly dispersely dissolved, as an isolated solid, in a solvent. This insoluble fraction corresponds in turn to that fraction of the polymer that is present in the dispersion in the form of intramolecularly crosslinked particles or particle fractions.

The polyurethane resin fraction present in the dispersion (1) preferably possesses a gel fraction of at least 55 wt %. The gel fraction may therefore be up to 100 wt % or approximately 100 wt %, as for example 99 wt % or 98 wt %. In such a case, then, the entire or virtually the entire polyurethane resin which makes up the polyurethane resin fraction is present in the form of crosslinked particles. It is sufficient, however, for at least half of the polyurethane resin fraction to be in the form of crosslinked particles.

The polyurethane resin fraction has its glass transition at a temperature of less than −20° C. and its melting transition at a temperature of less than 100° C. (for measurement method, see Examples section).

This therefore means immediately that the polyurethane resin fraction in any case has semicrystalline character. Indeed, as is known, a glass transition always means that an amorphous solid (glasslike, not crystalline) softens, whereas a melting transition means that a crystalline system melts—that is, crystalline structures present beforehand are no longer present thereafter. Resins or polymers which are purely amorphous on an ideal-theoretical basis therefore have only a glass transition, but not a melting transition (or any such transition is not resolvable technically when the actual system is measured). Polymers which are highly or purely crystalline on an ideal-theoretical basis have only melting transitions, but do not possess a glass transition (or any such transition is not resolvable technically when measured on the actual system). A system in which both characteristics, in other words amorphous and crystalline properties, are clearly present therefore exhibits both a glass transition and a melting transition. The system therefore has both amorphous and crystalline domains (semicrystalline). Of course, the melting transition always proceeds at higher temperatures than the glass transition.

Wording to the effect that the polyurethane resin fraction has its glass transition at a temperature of less than −20° C. therefore means that from the corresponding temperature onward, there is no longer a glasslike structure (no amorphous solid structure) present in the polyurethane resin fraction. The glass transition can be understood technically by measurement (for further details, see Examples section).

Wording to the effect that the polyurethane resin fraction has its melting transition at a temperature of less than 100° C. therefore means that from the corresponding temperature onward, there are no longer any crystallites present. However, even before the temperature in question has been reached, and above the glass transition temperature, the system is of course already partly softened. Indeed, exactly such partial softening of the amorphous fraction occurs at the glass transition. The melting transition may likewise be understood technically by measurement (for further details, see Examples section). In any case, however, the melting transition takes place below a temperature of 100° C.

Accordingly, the polyurethane resin fraction may comprise polyurethane resins which are semicrystalline, and/or it comprises both highly crystalline and amorphous polyurethane resins.

The polyurethane resin fraction has its glass transition at a temperature of less than −20° C. Preferably the glass transition is in the range from −100° C. to less than −20° C., more preferably −90° C. to −40° C.

The polyurethane resin fraction has its melting transition at a temperature of less than 100° C. Preferably the melting transition is at a temperature in the range from −20° C. to less than 90° C., more preferably −15° C. to less than 80° C.

The component (1) for use is an aqueous dispersion, meaning that it comprises a dispersion medium, in the present case water more particularly, and particles dispersed therein, these being polymer particles. Accordingly, the polyurethane resin fraction and the polyurethane resins which make up that fraction are dispersed in the form of polymer particles in the dispersion medium. The particle size of the polyurethane resin particles is situated, for example, within the customary ranges for polymer dispersions. It is preferable though for the polyurethane resin fraction to include at any rate, though not necessarily exclusively, particles having a size of greater than 1 micrometer. Preferred ranges here are from 1 to 100 micrometers. The particle size at this point should not be understood as an average particle size of all the particles in the dispersion. That detail would be impracticable, especially in the event that the polyurethane resin fraction was composed of different polyurethane resins and/or polyurethane particles having not a monomodal distribution but rather a multimodal—bimodal, for example—distribution. The situation instead is that the dispersion fundamentally includes particles which lie within the corresponding size range. A particle size distribution obtained technically by measurement (distribution curve, volume density) which may therefore be monomodal or multimodal, bimodal for example, then indicates that the dispersion includes particles within the stated range. The distribution curves (volume density) can be determined by laser diffraction, allowing optimum capture of size distributions within the corresponding range. Measurement took place for the purposes of the present invention with a Mastersizer 3000 particle size measuring instrument (from Malvern Instruments). To set the concentration range suitable for the measurement, the sample was diluted with particle-free, deionized water as dispersing medium (refractive index: 1.33), the obscuration was set at between 3% and 15%, depending on each sample, and measurement took place in the Hydro 2000G dispersing unit (from Malvern Instruments). Measurement took place at a stirring speed of 3000 l/min, with equilibration at this speed for 5 minutes prior to the measurement. The volume-weighted size distribution was calculated using the Malvern Instruments software (version 5.60) by means of Fraunhofer approximation.

With preference, the dispersion (1), based on the total weight of the polyurethane resin fraction, comprises at least 10 wt %, preferably at least 20 wt %, more preferably at least 30 wt %, and very preferably at least 50 wt % of polyurethane resin particles having a particle size of more than 1 micrometer, preferably 1 to 100 micrometers. The polyurethane resin fraction, which consists of at least one polyurethane resin which is present in the form of disperse particles, therefore includes at least 10 wt % (or at least 20 wt %, 30 wt %, 50 wt %) of particles having such sizes.

The polyurethane resin fraction of the dispersion (1) is preferably thermochemically curable only in minor efficiency with components containing isocyanate groups, such as a hydrophilically modified polyisocyanate (2), for example. This means that by combining the corresponding polyurethane resins of the dispersion (1) with a component containing isocyanate groups it is not possible to form a typical thermochemically cured coating. Accordingly, the at least one polyurethane resin in the polyurethane resin fraction preferably possesses only a minor amount of functional groups which are able to enter into crosslinking reactions with isocyanate groups under crosslinking conditions as described earlier on above. Consequently, the amounts of such functional groups that are able to enter into crosslinking reactions with isocyanate groups under crosslinking conditions as described above, more particularly of hydroxyl groups and amino groups, are preferably not sufficient for a typical thermochemically cured coating to be formed through the use of these polyurethane resins.

In the preparation of the polyurethane resins which make up the polyurethane resin fraction, the amounts of the starting products for the preparation are preferably selected such that the ratio of the total molar amount of isocyanate groups to the total molar amount of functional groups which are able to enter into crosslinking reactions with isocyanate groups, more particularly of hydroxyl groups and amino groups, is greater than 0.9. More preferably the stated ratio is greater than 0.95, especially at least 1.0, very preferably exactly 1.0.

The polyurethane resin fraction preferably comprises potentially ionic groups, for example potentially anionic groups, preferably carboxylic or sulfonic acid groups, especially carboxylic acid groups. Such groups are known to be advantageous in the formation of an aqueous dispersion. Accordingly, in the preparation of the polyurethane resins which make up the polyurethane resin fraction, preference is given to using monomers which as well as groups for reaction in the preparation of urethane bonds, preferably hydroxyl groups and/or amino groups, also include carboxylic or sulfonic acid groups. In this way the groups in question are introduced into the prepolymer. Examples of compounds preferred in this context include monocarboxylic acids containing two hydroxyl groups or two amino groups, such as dihydroxypropionic acid, dihydroxysuccinic acid, and dihydroxybenzoic acid, for example, and also N-(2-aminoethyl)-2-aminoethanecarboxylic acid and N-(2-aminoethyl)-2-aminoethanesulfonic acid. Especially preferred are alpha,alpha-dimethylolalkanoic acids such as 2,2-dimethylolacetic acid, 2,2-dimethylolpropionic acid, 2,2-dimethylolbutyric acid, and 2,2-dimethylolpentanoic acid, especially 2,2-dimethylolpropionic acid, and also N-(2-aminoethyl)-2-aminoethanecarboxylic acid. A controlled, at least proportional neutralization of the stated groups using neutralizing agents already identified above is of course likewise possible.

The dispersion (1) is aqueous. The expression "aqueous" in connection with aqueous polymer dispersions is known. Such a dispersion includes water in particular as dispersion medium. The principal constituents of the dispersion (1) are therefore water and the polyurethane resin fraction. The dispersion (1) may of course, however, also contain further constituents additionally. Examples include organic solvents and/or typical auxiliaries such as emulsifiers and protective colloids. Likewise present there may be, for example, inorganic components such as silicates or polysilicas, in which case the latter, for example, may contribute to the matting effect of the coating which is ultimately to be produced.

The fraction of the polyurethane resin fraction in the dispersion (1) is preferably 15 to 60 wt %, preferably 20 to 50 wt %, based in each case on the total amount of the dispersion (1).

The fraction of water in the dispersion (1) is preferably 40 to 85 wt %, preferably 50 to 80 wt %, based in each case on the total amount of the dispersion.

The sum of the fraction of the polyurethane resin fraction and the fraction of water in the dispersion is preferably at least 75 wt %, preferably at least 85 wt %.

The dispersions (1) described may be prepared by methods known to the skilled person, as for example by reaction of corresponding starting components in organic solvents for the preparation of polyurethane resins, and subsequent dispersal in aqueous phase and removal of organic solvents. Corresponding dispersions are also available commercially, for example, under the trade name Astacin Novomatt (from BASF), for example.

The fraction of the at least one aqueous dispersion (1) may be situated for example in the range from 35 to 85 wt %, preferably 40 to 80 wt %, more preferably 55 to 75 wt %, based in each case on the total weight of the clearcoat material for inventive use.

The clearcoat material (k) for inventive use comprises, in the curing component (k.2), at least one hydrophilically modified polyisocyanate (2) having an isocyanate content of 8% to 18%.

The hydrophilically modified polyisocyanates (2) may be prepared by modification of polyisocyanates (2a) known per se to the skilled person, these being organic polyisocyanates (2a). The components in question are the known aliphatic and aromatic components which contain on average more than one isocyanate group per molecule. Use may be made of the polyisocyanates (2a) known per se, such as aliphatic and aromatic polyisocyanates, especially diisocyanates and the dimers and trimers thereof, such as uretdiones and isocyanurates. Examples of polyisocyanates (2a) that can be used include hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanato-cyclohexane, and 2,4- or 2,6-diisocyanato-1-methylcyclohexane, the dimers and trimers thereof, and also mixtures of these polyisocyanates.

Preferred polyisocyanates (2a) are the known dimers and/or trimers of the aforementioned diisocyanates, in other words, in particular, the uretdiones and isocyanurates, known per se, of the aforementioned diisocyanates. More preferred are isocyanurates, preferably isocyanurates of hexamethylene 1,6-diisocyanate (HDI).

As is known, such isocyanurates can be prepared from a wide variety of isocyanates, in the presence of particular catalysts, examples being sodium formate, potassium acetate, tertiary amines, or triphenyl-phosphines. Formed in this preparation are the highly stable isocyanurate ring systems, which are stable even at high temperatures of more than 100° C., for example, and which are formed of three isocyanate groups in each case. Each of these three isocyanate groups comes from three different molecules of the respective isocyanate used, meaning that trimer structures are formed. Whereas the molecules formed in each case when using monoisocyanates have an unambiguous definition through the respective chemical structural formula, the reaction in the case of polyisocyanates, as for example diisocyanates such as HDI, need not proceed in such a uniform way, and results in particular in more highly crosslinked, so-called isocyanurate polyisocyanates (for example isocyanurate diisocyanates) or mixtures of different isocyanurate polyisocyanates. These, then, are isocyanurates with partially polymeric character, based on a polyisocyanate, such as on a diisocyanate, for example. Depending on the choice of reaction regime and reaction conditions, which are known per se, this means, for example, that further diisocyanates may add to an isocyanurate trimer which has already been formed, and further isocyanurate ring systems may be produced, in which case various products with higher molecular weights are formed. At the same time there is a reduction here in the average number of isocyanate groups, relative to a monomeric diisocyanate. While this number is exactly 1 in the ideal trimer, consisting of precisely three diisocyanate molecules, this number falls to less than 1 in more highly crosslinked isocyanurate polyisocyanates. Another known possibility is that, for example, for adjusting the reactivity of the isocyanurates, fractions of bridging diols, hexanediol for example, may also be added during their preparation, and in this way a number of isocyanurate ring systems may be joined to one another.

As is known, the amount of isocyanate groups in polyisocyanates, such as in isocyanurates of diisocyanates, for example, is reported generally by way of the isocyanate content. The isocyanate content is the mass fraction of the free isocyanate groups in polyisocyanates, expressed in percent. For the purposes of the present invention, the isocyanate content is determined according to DIN EN ISO 11909 by reaction of the respective sample with excess dibutylamine and back-titration of the excess with hydrochloric acid against bromophenol blue.

If the starting material used is a particular diisocyanate, HDI for example, and if isocyanurates are then prepared on the basis of this diisocyanate, using the methods known per se and already illustrated above, especially isocyanurates with polymeric character, then the isocyanate content reflects the degree of crosslinking of the respective isocyanurate or isocyanurate diisocyanate. A direct conclusion from the description above is as follows: the lower the isocyanate content, the higher the crosslinking density. Thus, for example, the theoretical isocyanate content of the purely trimeric isocyanurate based on HDI has the maximum value of about 25% (molecular weight 3×NCO=126 g/mol; molecular weight of the purely trimeric isocyanurate of HDI=504.6 g/mol).

The polyisocyanates (2) are hydrophilically modified, thus meaning in particular that they are prepared by hydrophilic modification of polyisocyanates (2a) as described above, preferably isocyanurates of HDI.

This means that the polyisocyanates (2) contain groups which, in comparison to groups and molecular units that are present in common polyisocyanates, such as in the above-described polyisocyanates (2a) more particularly, are more hydrophilic. The groups, consequently, are at any rate more hydrophilic than pure hydrocarbon groups or hydrocarbon fractions. Preferred groups are polyether groups and polyester groups. Preferred polyisocyanates (2) are therefore polyether-modified and/or polyester-modified polyisocyanates. Polyether-modified polyisocyanates are especially preferred.

A polyether-modified polyisocyanate (2) therefore comprises polyether groups such as polyether chains, especially preferably polyoxyalkylene chains. Further-preferred polyether groups are polyoxyethylene, polyoxypropylene and/or mixed polyoxyethylene-polyoxypropylene groups and/or chains. Polyether modification of polyisocyanates refers for the purposes of the present invention in particular to modification with alkoxypolyoxyalkylene groups, preferably methoxy-polyoxyalkylene groups. With very particular preference the groups in question are methoxypolyoxyethylene groups, methoxypolyoxypropylene groups and/or mixed methoxy-polyoxyethylene-polyoxypropylene groups.

To introduce the hydrophilic modifications it is possible, for example, to use the alkoxypoly(oxyalkylene) alcohols which are known to the skilled person and are also available commercially. In that case there is then a proportional reaction of the isocyanate groups in the polyisocyanate (2a) with the polymeric monoalcohols, as a result of which the polyether modifications—that is, for example, the poly(oxyalkylene) groups—are attached covalently to the polyisocyanate (2a) by formation of urethane bridges, and a hydrophilically modified polyisocyanate (2) is formed.

Similar comments apply in respect of polyester-modified polyisocyanates (2). Preferred are aliphatic, linear polyester groups, especially preferably polylactone groups, more preferably polycaprolactone groups. Polycaprolactones and their preparation, through reaction of a monoalcohol with epsilon-caprolactone, for example, are known. They too can be introduced into a polyisocyanate (2a) by common methods, via reaction of the at least one hydroxyl group they contain with an isocyanate group.

It is evident accordingly that the hydrophilic modification removes isocyanate groups from the system and so leads to a reduction in the isocyanate content relative to the respective polyisocyanate without modification. The reactions underlying the modification, and the reaction conditions to be selected in this context, are known to the skilled person and can be readily adapted according to the case in hand. It is important, however, that the polyisocyanate (2) that is ultimately prepared has the following features: it is a polyisocyanate, meaning that it must have on average more than one isocyanate group per molecule. It must have an isocyanate content of 10% to 18%. It must contain hydrophilic groups, especially poly(oxyalkylene) groups and/or aliphatic, linear polyester groups, with preference among these being given to polyoxyethylene, polyoxypropylene and/or mixed polyoxyethylene-polyoxypropylene groups, and/or polylactone groups.

Subject to these provisos, the fraction of isocyanate groups modified in the polyisocyanate (2) may vary widely and is situated for example in the range of 1-60 mol %, preferably 2-55 mol %, especially preferably 5-50 mol %. The stated molar fraction is based on the free isocyanate groups of the polyisocyanate (2a) before the modification.

The at least one hydrophilically modified polyisocyanate (2) preferably has an isocyanate content of 9% to 16%, more preferably of 10% to 14%.

The fraction of the at least one hydrophilically modified polyisocyanate (2) is preferably 3 to 15 wt %, more particularly 4 to 14 wt %, very preferably 6 to 12 wt %, based in each case on the total amount of the clearcoat material (k) for inventive use.

The hydrophilically modified polyisocyanates (2) described are available commercially and can be used as they are in the clearcoat material.

In the base component, the clearcoat material (k) for inventive use preferably further comprises at least one further specific aqueous dispersion (3).

The aqueous dispersion (3) includes at any rate water and a polyurethane resin fraction, this polyurethane resin fraction consisting of at least one polyurethane resin. The polyurethane resin fraction is of course different from the above-described polyurethane resin fraction of the dispersion (1).

The polyurethane resin fraction of the dispersion (3) possesses a gel fraction of at least 50 wt %, preferably at least 60 wt %, especially preferably of at least 75 wt %. The dispersion (3) as well, therefore, is a microgel dispersion.

The polyurethane resin fraction preferably consists of exactly one polyurethane resin.

The average particle size (volume average) of the polyurethane resin fraction of the dispersion, dispersed in the form of particles, is preferably from 20 to 500 nanometers, more preferably from 40 to 300 nanometers. This can be measured, in accordance with DIN EN ISO 11357-1, by photon correlation spectroscopy (PCS) by means of a Malvern Nano S90 instrument (from Malvern Instruments) at 25±1° C., and can be evaluated using a digital correlator, with the assistance of the Zetasizer analytical software version 6.32 (from Malvern Instruments), and the measurements can be verified using polystyrene standards having certified particle sizes between 50 to 3000 nm.

It follows from the above that the polyurethane resin fraction preferably possesses a monomodal particle size distribution. Firstly, indeed, the polyurethane resin fraction preferably consists of exactly one polyurethane resin, with exactly one polyurethane resin generally being constituted in the form of a monomodal distribution in a dispersion. Secondly, such a monomodal distribution can be described very well via an average particle size.

The polyurethane resin fraction of the dispersion (3) preferably has its glass transition at a temperature of less than 0° C. The glass transition is preferably in the range from −100° C. to −20° C., more preferably −80° C. to −30° C.

Even more preferably the polyurethane resin fraction of the dispersion (3) has no melting transition in the range of less than 100° C. Accordingly, then, in one alternative the polyurethane resin fraction has no melting transition at all, and is therefore purely amorphous in character. Alternatively it possesses (semi)crystalline character, in which case the melting transition is at at least 100° C. With preference the polyurethane resin fraction of the dispersion (3) possesses no melting transition at all.

The polyurethane resin fraction of the dispersion (3) is preferably not effectively thermochemically curable with components containing isocyanate groups, such as with a hydrophilically modified polyisocyanate (2), for example. Hence it is the case that the hydroxyl number and the amine number of the polyurethane resin fraction of the dispersion (3) are preferably less than 20.

In the preparation of the polyurethane resins of the dispersion (3) that make up the polyurethane resin fraction, the amounts of the starting products for the preparation are preferably selected such that the ratio of the total molar amount of isocyanate groups to the total molar amount of functional groups which are able to enter into crosslinking reactions with isocyanate groups, more particularly of hydroxyl groups and amino groups, is greater than 0.9. More preferably the stated ratio is greater than 0.95, more particularly at least 1.0, very preferably exactly 1.0.

The polyurethane resin fraction of the dispersion (3) preferably comprises potentially ionic groups, as for example potentially anionic groups, preferably carboxylic or sulfonic acid groups.

The parent polyurethane resins are preferably prepared as follows. In organic solution, (i) a polyurethane prepolymer containing isocyanate groups is prepared, and (ii) this prepolymer is reacted with monocarboxylic acids containing two amino groups, before, during, or after the prepolymer has been dispersed in aqueous phase. In this way, then, the potentially anionic groups are incorporated into the polymer as well. Before, during, or after the dispersing, it is also possible optionally for a reaction to be carried out with further typical diamines, for chain extension. Monocarboxylic acids containing two amino groups and used with preference are N-(2-aminoethyl)-2-aminoethanecarboxylic acid and N-(2-aminoethyl)-2-aminoethanesulfonic acid. The dispersions (3) used in the examples were also prepared in this way.

The fraction of the polyurethane resin fraction in the dispersion (3) is preferably 25 to 55 wt %, preferably 30 to 50 wt %, based in each case on the total amount of the dispersion (3).

The fraction of water in the dispersion (3) is preferably 45 to 75 wt %, preferably 50 to 70 wt %, based in each case on the total amount of the dispersion.

The sum of the fraction of the polyurethane resin fraction and of the fraction of water in the dispersion (3) is preferably at least 75 wt %, preferably at least 85 wt %.

Dispersions (3) of this kind as well are available commercially, for example, under the commercial designation Bayhydrol UH (from Bayer), for example.

The fraction of the at least one aqueous dispersion (3) may be situated, for example, in the range from 15 to 45 wt %, preferably 25 to 35 wt %, based in each case on the total weight of the clearcoat material (k) for inventive use.

The clearcoat material (k) for inventive use is aqueous (for definition, see above). Preferred definitions of the term "aqueous" in relation to the clearcoat material (k) are given later on below.

It is important, however, that the water is used as a constituent of the paint base component. The reason is that the hydrophilically modified polyisocyanate (2) reacts on contact with water, as already described above. These reactions, however, are to take place only when the two components of the clearcoat material are combined and when the thermochemical curing then desired takes place. Accordingly, the curing component (k.2) is preferably water-free or the water is added to the curing component (k.2) only shortly before it is combined with the paint base component (k.1), in other words, in particular, less than 5 minutes before they are combined.

As further constituents it is possible for the clearcoat material (k) for inventive use to include any of a very wide variety of coating components known to the skilled person in the field.

Accordingly, the clearcoat material may comprise curable resins other than the polymers already stated, as binders, and can comprise organic solvents, reactive diluents, transparent pigments, fillers, molecularly dispersely soluble dyes, nanoparticles, light stabilizers, antioxidants, deaerating agents, emulsifiers, slip additives, polymerization inhibitors, adhesion promoters, flow control agents, film-forming assistants, thickeners, sag control agents (SCAs), flame retardants, corrosion inhibitors, catalysts such as amines, NaOH, salts of strong acids or weak bases, waxes, siccatives, biocides and/or matting agents. The aforementioned enumeration should of course not be taken as exhaustive. The clearcoat material (k) preferably contains less than 1 wt %, preferably less than 0.5 wt %, of color-imparting and/or effect-imparting pigments and also dyes, based in each case on the total weight of the clearcoat material.

The solids content of the clearcoat material (k) may vary according to the requirements of the case in hand. The solids content is guided primarily by the viscosity that is required for application, especially spray application, and so can be adjusted by the skilled worker on the basis of his or her general art knowledge, possibly with the assistance of a few rangefinding tests.

The solids content of the clearcoat materials (k) is preferably 15 to 65 wt %, more preferably 17.5 to 55 wt %, and very preferably 20 to 45 wt %.

By solids content (nonvolatile fraction) in the context of the present invention is meant the weight fraction which remains as a residue on evaporation under specified conditions. In the present specification, the solids content is determined according to DIN EN ISO 3251. This is done by evaporating the sample under analysis—the clearcoat material, for example—for 60 minutes at 130° C.

Unless indicated otherwise, this test method is likewise employed in order, for example, to specify or predetermine the fraction of various components in a coating composition, such as in the clearcoat material (k). A determination is therefore made, for example, of the solids content of a dispersion (1) that is to be added to the clearcoat material. By taking account of the solids content of the dispersion and of the amount of the dispersion used in the clearcoat material, it is then possible to determine or specify the fraction of the component as a proportion of the overall composition.

The term "aqueous clearcoat material (k)" should be understood preferably, for the purposes of the present invention, as follows:

The percentage sum of the solids of the clearcoat material and the fraction of water in the clearcoat material is at least 75 wt %, preferably at least 85 wt %. In this figure, the solids content, which traditionally possesses only the unit "%", is expressed in "wt %". Since the solids content ultimately is a percentage weight figure as well, this form of its representation is justified. Where, for example, a clearcoat material has a solids content of 35% and a water content of 50 wt %, the above-defined percentage sum of the solids content of the clearcoat material and the fraction of water in the clearcoat material amounts to 85 wt %.

This means that preferred clearcoat materials for inventive use fundamentally include environmentally burdensome components, such as organic solvents in particular, at a comparatively low fraction of, for example, less than 25 wt %, preferably less than 15 wt %.

The coatings (B) of the invention on substrates possess a good optical quality, more particularly a high matting effect and, consequently, an optically high-grade and refined appearance. At the same time they exhibit high mechanical resistance and flexibility, and also good soil attraction resistance, good retention behavior, and outstanding weathering stability.

Also provided by the present invention, accordingly, is the use of the coatings of the invention for increasing the stability of substrates, especially flexible foam substrates, with respect to external mechanical influences, more particularly the abrasion resistance and stonechip resistance. Equally provided by the present invention is the use of the coatings of the invention for improving the soil attraction resistance, the retention behavior and/or the weathering stability of substrates.

The invention is elucidated below with a number of examples.

EXAMPLES

Measurement Methods:
Gel Fraction:

The gel fraction, in particular of polyurethane resin fractions of corresponding aqueous dispersions, is determined gravimetrically in the context of the present invention. Here, first of all, the polymer present was isolated from a sample of an aqueous dispersion (initial mass 1.0 g) by freeze-drying. Following determination of the solidification temperature—the temperature above which the electrical resistance of the sample shows no further change when the temperature is lowered further—the fully frozen sample underwent its main drying, customarily in the drying vacuum pressure range between 5 mbar and 0.05 mbar, at a drying temperature lower by 10° C. than the solidification temperature. By graduated increase in the temperature of the heated surfaces beneath the polymer to 25° C., rapid freeze-drying of the polymers was achieved; after a drying time of typically 12 hours, the amount of isolated polymer (solid fraction, determined by the freeze-drying) was constant and no longer underwent any change even on prolonged freeze-drying. Subsequent drying at a temperature of 30° C. of the surface beneath the polymer, with the ambient pressure reduced to the maximum degree (typically between 0.05 and 0.03 mbar), produced optimum drying of the polymer.

The isolated polymer was subsequently sintered in a forced air oven at 130° C. for one minute and thereafter extracted for 24 hours at 25° C. in an excess of tetrahydrofuran (ratio of tetrahydrofuran to solid fraction=300:1). The insoluble fraction of the isolated polymer (gel fraction) was then separated off on a suitable frit, dried in a forced air oven at 50° C. for 4 hours, and subsequently reweighed.

It was further ascertained that at the sintering temperature of 130° C., with variation in the sintering times between one minute and twenty minutes, the gel fraction found for the microgel particles is independent of the sintering time. It can therefore be ruled out that crosslinking reactions subsequent to the isolation of the polymeric solid increase the gel fraction further.

Given that some of the aqueous, commercially acquired polymer dispersions used additionally include inorganic components such as silicates, and the fraction of these inorganic components is of course captured as well in the determination of the gel fraction, all of the dispersions were incinerated (800° C.) and any remaining ash content was then subtracted from the gel fraction found.

Glass Transition and Melting Transition:

The glass transition is determined on the basis of the glass transition temperature. The glass transition temperature in the context of the invention is determined experimentally in a method based on DIN 51005 "Thermal Analysis (TA)—

Terms" and DIN 53765 "Thermal Analysis—Differential Scanning calorimetry (DSC)". A sample of the binder is applied with a wet film thickness of 100 μm, using a doctor blade, to a glass plate, dried initially at 40° C. for 1 hour and then dried at 110° C. for 1 hour. For the measurement, a section of the film thus dried is removed from the glass plate and inserted into the measuring sleeve. This sleeve is then inserted into a DSC instrument. It is cooled to the start temperature, after which $1^{st}$ and $2^{nd}$ measurement runs are carried out at a heating rate of 10 K/min with inert gas flushing ($N_2$) of 50 ml/min, with cooling again to the start temperature between the measurement runs.

A glass transition can be seen in the DSC diagram as a section of the measurement curve that in terms of amount possesses a slope much greater in relation to the baselines before and after the transition. The slope greater in terms of amount is known to be attributable to the higher quantity of energy needed in the region of the phase transition in order to increase the temperature. A measurement curve section of this kind then, of course, possesses a point of inflection in the region with the slope that is greater in terms of amount. For the purposes of the present invention, the glass transition temperature of a glass transition is taken to be the temperature of this point of inflection in the $2^{nd}$ measurement run.

The temperature at which the polyurethane resin fraction has its glass transition is defined as follows in the context of the present invention: it is the temperature at the point of inflection of the curve section assignable to the glass transition (glass transition temperature). It is possible for there to be a number of curve sections present which can be assigned to glass transitions. The system in question in that case has a number of glass transitions and glass transition temperatures. In such an event, the temperature at which the polyurethane resin fraction has its glass transition is the temperature at the point of inflection of the curve section in the highest temperature range. In such an event, indeed, it is only after the last glass transition that there is no longer any glasslike structure at all in the corresponding polyurethane resin fraction. The expression "its glass transition" can therefore be equated with the wording "its complete glass transition" or "its glass transition with the highest temperature".

The melting transition is likewise determined from the DSC diagram measured as described above. A melting transition is seen as a region which deviates from the baseline in the DSC diagram. Within this region, in fact, the system must be supplied with a greater quantity of energy, owing to the phase conversion of the crystallites, in order to bring about an increase in temperature. These regions, as is known, are seen as peaks with different widths.

The temperature at which the polyurethane resin fraction has its melting transition is defined as follows in the context of the present invention: it is the temperature at the extreme point of the peak assignable to the melting transition. Where there are a number of peaks present to which melting transitions are assignable, the extreme point in question is that of the peak in the highest temperature range. In such an event, indeed, the system has a number of melting transitions. Accordingly, there is no longer any crystalline structure present in the corresponding polyurethane resin fraction only after the last melting transition. The expression "its melting transition" can therefore be equated with the wording "its complete melting transition" or "its melting transition with the highest temperature".

1 Preparation of Clearcoat Materials and Production of Coatings

The paint base components of different clearcoat materials were acquired directly as commercial product or prepared by successively combining the respective constituents and intimately mixing them in a dissolver (table 1a). Clearcoat materials (k) for inventive use carry the code I, comparative systems the code C. The curing components of the individual coating materials are listed in table 1b. The figures reported are in each case the parts by weight of the components that were used.

TABLE 1a

Paint base components

| Item | Component | k I1 | k I2 | C1 | C2 |
|------|-----------|------|------|-----|-----|
| 1 | Base varnish of a commercial clearcoat, glossy, scratch-resistant (Glasurit HS, Universal Clear VOC 923-115) | — | — | 100.00 | — |
| 2 | Base varnish of another commercial clearcoat, flatting, flexible (Glasurit MS Clear Matt Flexible 923-57) | — | — | — | 100.00 |
| 3 | Aqueous dispersion (1) | 72.04 | 70.60 | — | — |
| 4 | First aqueous dispersion (3) | 23.59 | 23.11 | — | — |
| 5 | Second aqueous dispersion (3) | 4.37 | 4.29 | — | — |
| 6 | Tinuvin 292 | — | 1.00 | — | — |
| 7 | Tinuvin 400 | — | 1.00 | — | — |

TABLE 1b

Curing components

| Item | Component | k I1 | k I2 | C1 | C2 |
|------|-----------|------|------|-----|-----|
| 8 | Polyether-modified HDI isocyanurate (2) having an isocyanate content of 11%, 70% strength in organic solvents | 8 | 8 | — | — |
| 9 | Commercial clearcoat curing agent, isocyanate-based (Glasurit Hardener 929-33) | — | — | 33 | 33 |

Aqueous dispersion (1): The commercial dispersion comprises a polyurethane resin fraction with a gel fraction of 61.3%. The polyurethane resin fraction has its glass transition at a temperature of −47° C. and its melting transition at a temperature of 50° C. The polyurethane resin fraction comprises particles having a particle size of 1 to 100 micrometers. The solids content of the dispersion is 26.5% including 1.8% of inorganic components (silicates) (determined via incineration, 800° C.)

Aqueous dispersions (3): The commercial dispersions comprise a polyurethane resin fraction having a gel fraction of 91% (first dispersion) or 95% (second dispersion). The average particle size (volume average) is 244 nanometers (first dispersion) or 56 nanometers (second dispersion). The polyurethane resin fractions have their glass transition at −48° C. (first dispersion) or −60° C. (second dispersion). Melting transitions at below 100° C. are not observed. The solids contents of the dispersions are 39.0% (first dispersion) and 37.0% (second dispersion).

Subsequently, using the clearcoat materials, coatings were produced directly on foam substrates. In this case the respective paint base component was not mixed homogeneously with the curing component until immediately prior to application. Application was made in a one-coat system (pneumatic manual coating). The clearcoat material was applied directly to the substrate and then, after a short flashing time, was cured in a forced air oven at 80° C. for 30 minutes. The clearcoat film thicknesses (cured) were in each case 20-25 micrometers. Substrates used were thermoplastic polyurethane bead foams in the form of sheets with a thickness of about 1 cm, and also footwear soles made of said material. The polyurethane bead foams were produced beforehand by expanding and fusing corresponding polyurethane pellets in corresponding molds by means of steam.

The following coatings (B) were produced (table 2):

TABLE 2

| Coatings | | | | |
|---|---|---|---|---|
| Coating | BI1 | BI2 | BC1 | BC2 |

2 Investigations on the Coatings

While coatings BI1 and BC2 had a matt, optically high-grade, and refined appearance, the shininess of coating BC1 was excessive, causing it to look "plasticky".

The flexibility and elasticity and also the abrasion resistance of the coatings BI1 and also BC1 and BC2, and of the uncoated foam substrate as well, were investigated. Furthermore, the soil attraction resistance was tested in relation to various soiling media. Tests conducted were as follows:

(a) The coated/uncoated substrate was bent over the edge of a steel panel 2 mm thick. A determination was made of the bending angle at which cracking/"breaking" was seen in the coating system.

(b) The coated/uncoated substrate was folded (180° bend) centrally with the coated side outward, and was grasped at both ends. The loading trial was carried out by moving the hands in opposite directions (twisting movement). The coated substrates were subsequently inspected.

(c) The coated/uncoated substrates were treated manually with different media (see table 3) in 15 double-rubs under uniform applied pressure. Thereafter the soiled surfaces were removed with a further 15 double-rubs, executed under running water with a rubber glove. The soiling residues remaining on the substrate were evaluated visually (scale from 0 (not visible) to 5 (no change as a result of washing)).

The results obtained were as follows:

Inventive coating BI1 showed no cracking/damage at all at a maximum possible bend of 180° over the metal edge (test (a)). Nor was it possible to find any changes after bending with the coated side outward (180°). The twisting movement as well showed no effect at all on the appearance of the coating (test (b)). Analogous results were obtained for the uncoated substrate.

In the case of the variants BC1 and also BC2, in test (a), breaking/cracking of the coating system was observed/heard, meaning that the coatings had been destroyed by fracturing and delamination. Furthermore, the unprotected substrate was visible. During the 180° folding (b), moreover, the samples undergo defined breaking along the bending edge; as a result of the twisting movement, the coating system tears and breaks without coordination in all directions. Overall, the results for BC2 were slightly better than for BC1, but at any rate were unacceptable.

The results with regard to soil attraction resistance (test (c)) are as follows (table 3):

TABLE 3

| Soil attraction behavior | | | | |
|---|---|---|---|---|
| | Uncoated substrate | BI1 | BC1 | BC2 |
| Soil attraction behavior | | | | |
| Grass cuttings | 1-2 | 1 | 0 | 0 |
| Leaf of taro vine | 3 | 2 | 1 | 1-2 |
| Green paper handtowels | 3 | 1 | 0 | 1 |
| Potting compost | 2 | 1 | 0 | 0 |
| Brake dust | 5 | 3 | 1 | 1 |

From table 3 it is apparent that the soil attraction behavior of the uncoated substrate is unacceptable.

The investigations overall showed that only the inventive coating has advantages in terms of elasticity and flexibility on the one hand and of high soil attraction resistance on the other. Furthermore, a high-grade optical appearance is realized.

3 Production of Further Coatings and Investigation of These Coatings

Further coatings were produced as described above under 1, with the clearcoat films in this case being produced on metal panels (Gardobond 26S/6800/OC) (the nature of the substrate is immaterial to the investigation that then takes place).

The cured coatings were then partly masked off and sprayed with a commercial impregnating spray (Nano Plus, Solitaire) from a distance of 30 cm in two spray passes, and then were left to dry in the air. The surface energies of the impregnated and unimpregnated coating portions were then measured (according to DIN 55660-2, instrument DSA100 from Krüss).

Following this, the above-described, impregnated coating was subjected to a GS97034-5 (BMW standard) abrasion test using a crockmeter (method B in accordance with DIN EN ISO 105-X12) (5 or 10 double-rubs with dry cotton rub cloth). Again, the surface energies were measured (after 5 and after 10 double-rubs).

The effect of an impregnating spray, namely protecting a surface and preserving it from soiling, is manifested in a significant reduction in the surface energy. The test described here evaluates the extent to which the spray, in other words the protective coat, remains on the coating in spite of mechanical loading from the abrasion test (quality of retention behavior).

The results are found in table 4.

TABLE 4

| Surface energies [mJ per square meter] | | | |
|---|---|---|---|
| | Coated, without impregnating spray | Coated, with impregnating spray | Coated, with impregnating spray, after 5 DR | Coated, with impregnating spray, after 10 DR |
| BI1 | 41.2 | 8.7 | 9.9 | 12.5 |
| BC1 | 43.9 | 8.7 | 24.5 | 33 |
| BC2 | 45.6 | 8.7 | 34.9 | 34.2 |

From table 4 it is apparent that both comparative systems exhibit much poorer retention of the low-surface-energy effect imparted by the impregnating spray. After 10 double-rubs in the abrasion test, the surface energy with both comparative examples is approximately that of the coated substrate without impregnating spray. In contrast, the inventive system exhibits outstanding retention behavior. This means that the soil attraction resistance, which is manifested in any case, can be improved significantly further by the enormously effective protective function developed by the spray.

Additionally, further coatings were produced as described above under 1, in this case using the clearcoat materials k I1 and k I2. The coatings produced accordingly, BI1 and BI2, were investigated for their weathering stability. An uncoated foam substrate was investigated for comparison.

The weathering test (traversal of a number of cycles, in which both irradiation and also temperature and humidity were varied) took place according to the WOM-PV 3930 method. The evaluation was visual on the basis of the following scale: 0 (no change in the substrate) to 5 (severe yellowing and destruction of the surface).

Table 5 shows the results.

TABLE 5

| | Weathering stability | | |
|---|---|---|---|
| | Uncoated substrate | BI1 | BI2 |
| Yellowing/surface damage | 5 | 4 | 1-2 |

The results show that the coated substrates exhibit better or much better weathering stability. Another great advantage is that through the simple addition of conventional additives such as UV stabilizers (tinuvins) to the clearcoat materials k, it is possible to set a significantly improved weathering stability. This improvement in properties, which is achievable in a very simple way, is of course possible only as a result of the realization of a coating (B).

The invention claimed is:

1. A method for producing a coating (B) on a substrate (S), comprising (I) producing a clearcoat (K) directly on the substrate (S) by applying an aqueous clearcoat material (k) directly to the substrate (S) and subsequently curing the applied clearcoat material (k), the clearcoat material (k) being a two-component coating composition comprising
   (k1) a paint base component comprising
      (1) at least one aqueous dispersion comprising water and a polyurethane resin fraction consisting of at least one polyurethane resin, the polyurethane resin fraction having a gel fraction of at least 50 wt %, having its glass transition at a temperature of less than 20° C., and having its melting transition at a temperature of less than 100° C., and
   (k2) a curing component comprising
      (2) at least one hydrophilically modified polyisocyanate having an isocyanate content of 8% to 18%.

2. The method as claimed in claim 1, wherein the hydrophilically modified polyisocyanates (2) are selected from the group of polyether- and/or polyester-modified polyisocyanates.

3. The method as claimed in claim 2, wherein the hydrophilically modified polyisocyanates (2) are selected from the group of polyoxyethylene-, polyoxypropylene- and/or mixed polyoxyethylene-polyoxypropylene-modified polyisocyanates.

4. The method as claimed in claim 3, wherein the polyoxyethylene-, polyoxypropylene- and/or mixed polyoxyethylene-polyoxypropylene-modified polyiso-cyanates are selected from the group of isocyanurates of the polyoxyethylene-, polyoxypropylene- and/or mixed polyoxyethylene-polyoxypropylene-modified polyiso-cyanates.

5. The method as claimed in claim 4, wherein the polyoxyethylene-, polyoxypropylene- and/or mixed polyoxyethylene-polyoxypropylene-modified polyiso-cyanates are selected from the group of isocyanurates of hexamethylene 1,6-diisocyanate.

6. The method as claimed in claim 1, wherein the polyurethane resin fraction of the at least one dispersion (1) has its glass transition at a temperature in the range from −100° C. to less than 20° C., has its melting transition at a temperature in the range from -20° C. to less than 90° C., and comprises particles having a particle size of greater than 1 micrometer.

7. The method as claimed in claim 1, wherein the clearcoat material (k) further comprises at least one further aqueous dispersion (3) comprising water and a polyurethane resin fraction consisting of at least one polyurethane resin, the polyurethane resin fraction of the aqueous dispersion (3) possessing a gel fraction of at least 50% and being present in the form of dispersed particles having a volume average particle size of 20 to 500 nanometers.

8. The method as claimed in claim 1, wherein no further coat other than the clearcoat is produced.

9. The method as claimed in claim 1, wherein the substrate used comprises a flexible substrate.

10. The method as claimed in claim 9, wherein the substrate comprises a flexible foam substrate.

11. The method as claimed in claim 10, wherein the substrate used comprises a thermoplastic polyurethane bead foam substrate.

12. The method as claimed in claim 1, wherein the clearcoat (K) is cured at temperatures between 40 and 120° C., preferably 60 to 100° C.

13. The method as claimed in claim 12, wherein the clearcoat (K) is cured at temperatures between 60 to 100° C.

14. A coating produced by the method as claimed in claim 1.

15. A substrate bearing a coating as claimed in claim 14.

16. A method for increasing the stability of substrates to external mechanical influences, for improving the soil attraction resistance of substrates, the weathering stability of substrates and/or the retention of applied protective substances, the method comprising applying the coating as claimed in claim 14.

17. The method as claimed in claim 16, wherein the method further comprises applying impregnating sprays.

* * * * *